United States Patent
Broga et al.

(10) Patent No.: US 8,797,269 B2
(45) Date of Patent: *Aug. 5, 2014

(54) AUTOMATIC KEYPAD BACKLIGHT ADJUSTMENT ON A MOBILE HANDHELD ELECTRONIC DEVICE

(71) Applicant: Research In Motion Limited, Waterloo (CA)

(72) Inventors: Antanas Matthew Broga, Cambridge, CA (US); Thomas James Crugnale, Kitchener, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/721,879

(22) Filed: Dec. 20, 2012

(65) Prior Publication Data

US 2013/0106295 A1  May 2, 2013

Related U.S. Application Data

(63) Continuation of application No. 12/570,244, filed on Sep. 30, 2009, now Pat. No. 8,363,015.

(60) Provisional application No. 61/156,096, filed on Feb. 27, 2009.

(51) Int. Cl.
*G09G 5/00* (2006.01)

(52) U.S. Cl.
USPC ............ 345/169; 345/168; 345/170; 345/102

(58) Field of Classification Search
CPC .............................. G09G 3/3406; G09G 3/34
USPC .................................. 345/168, 169, 170, 102
See application file for complete search history.

(56) References Cited

U.S. PATENT DOCUMENTS

| 8,363,015 B2 | 1/2013 | Broga et al. |
| 2006/0135224 A1* | 6/2006 | Patino et al. ................ 455/575.3 |
| 2007/0097065 A1* | 5/2007 | Kreek et al. ................... 345/102 |
| 2010/0177029 A1* | 7/2010 | Yeh ............................... 345/102 |

* cited by examiner

*Primary Examiner* — Latanya Bibbins
(74) *Attorney, Agent, or Firm* — Perry + Currier Inc.

(57) ABSTRACT

A method is set forth for automatically adjusting keypad brightness on a mobile electronic device having a light sensor, a keypad and a backlight for the keypad, comprising obtaining light level samples from the light sensor, turning the backlight from off to on in the event a current light level sample is less than a threshold value below which backlight illumination becomes necessary in order to read the keypad, and from off to on after a predetermined time period in the event the current light level sample is greater than the threshold value.

16 Claims, 4 Drawing Sheets

AUTOMATIC KEYPAD BACKLIGHT ADJUSTMENT ON A MOBILE HANDHELD ELECTRONIC DEVICE

CROSS-REFERENCE TO RELATED APPLICATION

This is a continuation of U.S. patent application Ser. No. 12/570,244, filed Sep. 30, 2009, which claims priority from U.S. Provisional Application No. 61/156,096, filed Feb. 27, 2009, the contents of which are incorporated herein by reference.

FIELD

The present application relates generally to electronic devices and more particularly to a method for controlling a backlight on a mobile electronic device for enhanced keypad readability in ambient lighting conditions that give rise to contrast inversion.

BACKGROUND

Keypad brightness on a handheld electronic device may be adjusted for different operating environments in order to enhance the visibility of key indicia (e.g. alphabetic characters, numbers). Conventional backlit keypads or keyboards, such as Logitech Illuminated Keyboard part number 920-000914 or MacBook Air part number MC233LL/A, are illuminated with a monochrome light source. A backlight controller varies the intensity of the monochrome light source based on measurements of ambient light intensity. Alternatively, if no light sensor is provided it is customary to illuminate the backlight whenever the device is powered on, to ensure that the keypad is readable in the dark.

Typically, the keys of a conventional backlit keypad are opaque, for example black with key indicia or characters thereon that are transmissive in order to allow light to pass through for the purpose of backlighting in dark environments and that are white or some other colour that creates suitable contrast for legibility. The backlight controller activates the keypad backlight when the keypad is exposed to dim or moderately-intense ambient light, and deactivates the keypad backlight when the keyboard is exposed to bright ambient light (e.g. in outdoor or sunlight conditions).

Cathey (U.S. Pat. No. 7,129,930) describes a backlit keyboard in which each key includes dark-coloured key indicia printed on a transparent light-coloured key face. Faraqe (U.S. Pat. No. 6,797,902) describes a keyboard in which each key is coupled to a large lamp that illuminates the transparent key face, and a small lamp that illuminates the dark-coloured key indicia. Knox (U.S. Pat. No. 6,950,087) describes a backlit keyboard in which the keys are illuminated by a variable-position prism that allows the user to manually adjust the colour of the backlight. Stokic (U.S. 2006/0061542) describes a keyboard that is coupled to a display controller. The display controller transmits key indicia to the keys, and adjusts the intensity of the key indicia, and the contrast between the background and the key indicia, based on the ambient light level. Kreek (U.S. 2007/0097065) sets forth a method for automatically adjusting screen and keypad brightness of non-contrast inversion keypads to improve legibility of the keypad on a mobile communication device, whereby in the event the ambient light level exceeds 50 Lux for 30 seconds the keypad backlight switches from on to off, and in the event the ambient light level falls below 16 Lux the keypad backlight switches from off to on. Sellers (U.S. 2007/0068784) sets forth a keyboard with lightpipes directing light to the underside of the keys.

A problem of readability of characters on a keypad or keyboard (or other input device, such as an instrument panel) occurs for a certain range of ambient lighting conditions where contrast inversion occurs (i.e. when a character changes from being a dark element in high ambient light conditions to being a light element in low ambient light conditions). This range of ambient lighting conditions occurs when there is 'dim' lighting (i.e. between daylight and darkness) such that the contrast ratio of the characters on the keypad decreases below a value at which they are no longer legible.

SUMMARY

According to an aspect of this specification a method is set forth for automatically adjusting keypad brightness on a mobile electronic device having a light sensor, keypad and a backlight for said keypad, comprising obtaining light level samples from the light sensor, turning the backlight from off to on in the event a current light level sample is less than a threshold value below which backlight illumination becomes necessary in order to read the keypad with an optimum contrast ratio between light and dark regions of key indicia thereof, and from on to off after a predetermined time period in the event the current light level sample is less than said threshold value but above a minimum contrast ratio between said light and dark regions of key indicia.

As described in greater detail below, the foregoing aspects minimize the impact on contrast ratio of the characters on a keypad in 'dim' lighting conditions by turning on the backlight such that the contrast between the illuminated characters and the light reflected from surrounding material maintains a ratio that is suitable for legibility (typically below an optimum value of approximately 3:1 but above a minimum value of 2:1).

BRIEF DESCRIPTION OF THE DRAWINGS

The exemplary method for automatically controlling a backlight will be better understood with reference to the following description and to the Figures, in which.

DETAILED DESCRIPTION OF THE EMBODIMENTS

Figure 1:
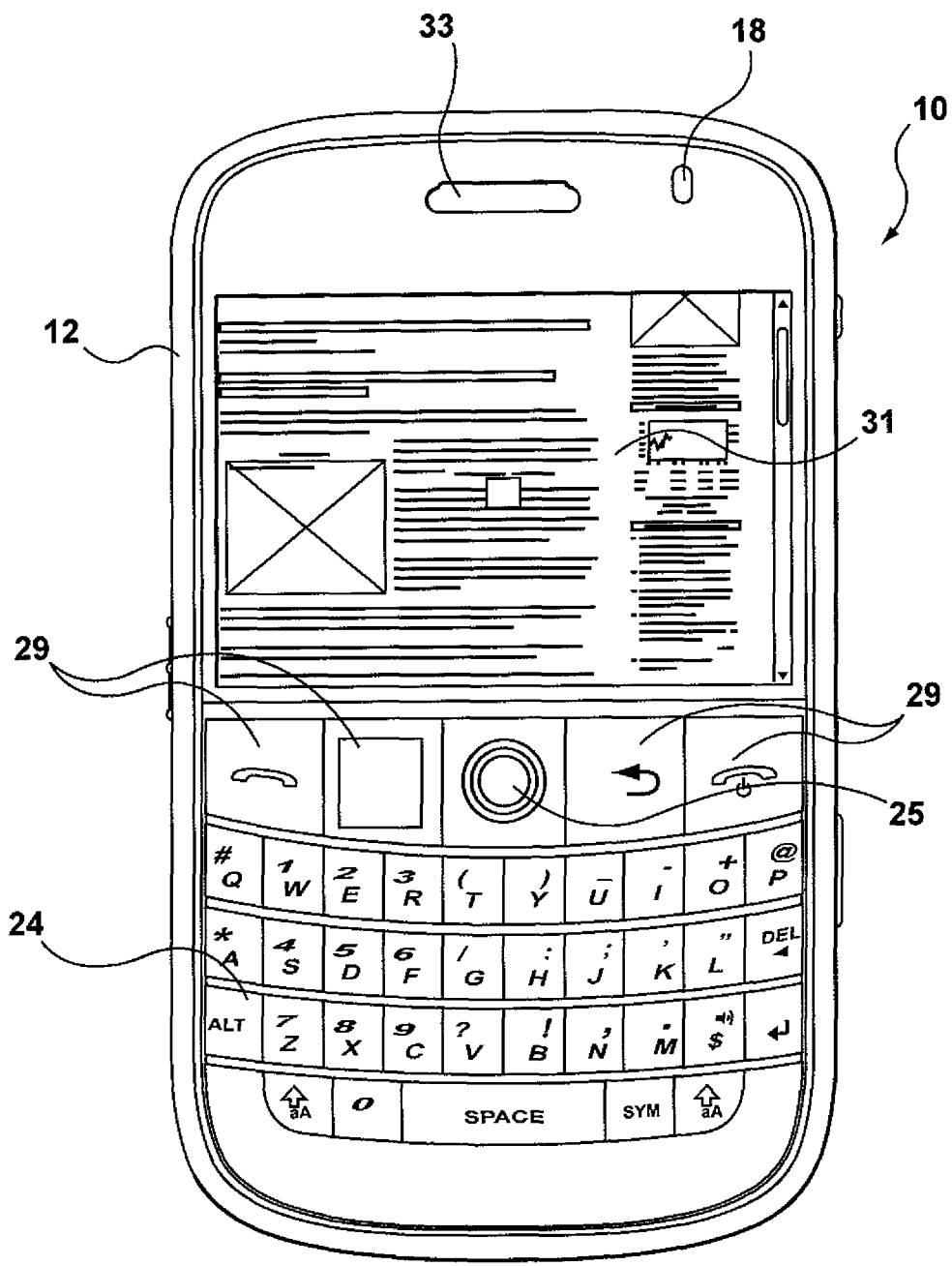
FIG. 1 is a representation of a mobile handheld electronic device in connection with which a method for automatically controlling a backlight is set forth in accordance with one embodiment.

Referring to FIG. 1, a mobile handheld electronic device is indicated generally by the numeral 10. In the present embodiment, the electronic device 10 is based on the computing environment and functionality of a mobile or smart phone. It will be understood, however, that the electronic device 10 is not limited to mobile phones and smart phones. Other electronic devices are possible, such as a wireless personal digital assistant, desktop computers, GPS receivers, and laptop computers. Referring again to the present embodiment, the electronic device 10 includes a housing 12 that frames an LCD display 31, a speaker 33, a message notification indicator 18, a multi-directional device such as a trackball 25, buttons 29 and a keyboard or keypad 24. Preferably, the message notification indicator 18 is in the form of a light pipe having two internal branches terminating respectively in a Light Emitting Diode (LED) and an ambient light sensor, as set forth in U.S. Pat. No. 7,352,930 entitled SHARED LIGHT PIPE FOR A MESSAGE INDICATOR AND LIGHT SENSOR, the contents of which are incorporated herein by reference. The housing 12 is made from a suitable material as will occur to those skilled in the art, and can be stored, for example, in a holster (not shown) that includes an attachment for attaching to a user's belt.

Figure 2:
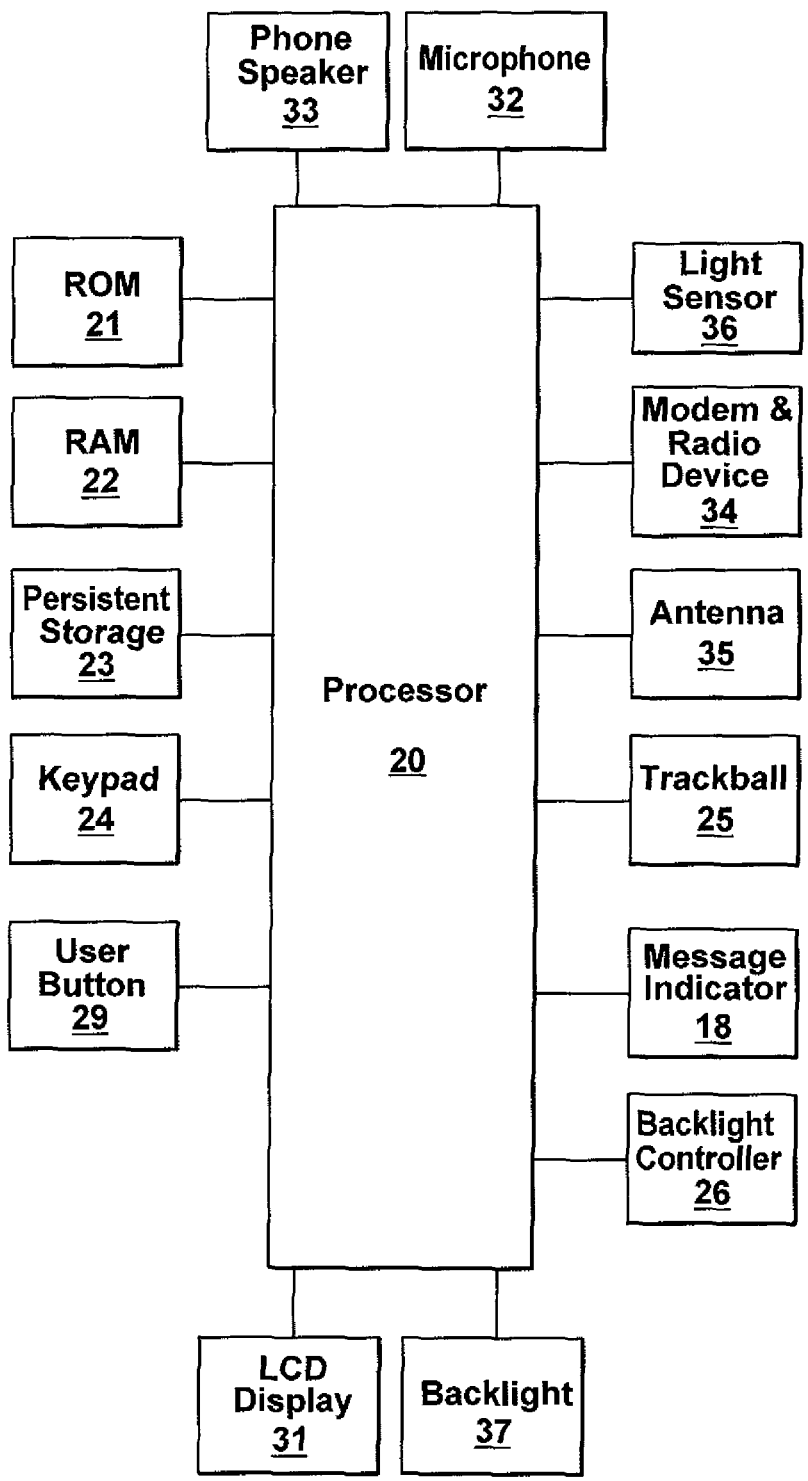
FIG. 2 is a block diagram of certain internal components within the electronic device of FIG. 1.

FIG. 2 is a block diagram showing certain components within an exemplary embodiment of the portable electronic device 10. The portable electronic device 10 includes a processor 20 connected to a read-only-memory (ROM) 21 that contains a plurality of applications executable by the processor 20 for enabling the portable electronic device 10 to perform certain functions including, for example, Personal Identification Number (PIN) message functions, Short Message Service (SMS) message functions, address book and calendaring functions, camera functions, and cellular telephone functions. More particularly, processor 20 may execute applications within ROM 21 for notifying the user of events such as incoming calls and/or emails, appointments, tasks, etc. The processor 20 is also connected to a random access memory unit (RAM) 22 and a persistent storage device 23 to facilitate various non-volatile storage functions of the portable electronic device 10. The processor 20 receives input from one or more input devices, including keypad 24, trackball 25, ambient light sensor 36 (preferably disposed within the housing 12 and receiving light from a light pipe terminating at indicator 18), and user buttons 29.

The processor 20 outputs to one or more output devices, including a Liquid Crystal Display (LCD) 31, a backlight controller 26 and message notification indicator 18. A microphone 32 and phone speaker 33 are connected to the processor 20 for cellular telephone functions. The processor 20 is also connected to a modem and radio device 34. The modem and radio device 34 is used to connect to wireless networks and transmit and receive voice and data communications through an antenna 35.

A typical backlight system comprises a backlight lighting source 37, such as a series of LEDs or a lamp located behind the keypad 24, and backlight controller 26 to control activation of the backlight 37. The lighting source may be fluorescent, incandescent, electroluminescent or any other suitable lighting source. As the backlight 37 is illuminated, light shines through the keypad 24 providing backlight to the key indicia thereon. The intensity of the backlight level may be controlled by the controller 26 in any of a plurality of ways, such as by adjusting current or voltage applied to the lighting source, by selectively activating a selected number of lighting sources (e.g. one, several or all LEDs) or by selectively controlling the activation duty cycle of the activated lighting sources (e.g. a duty cycle anywhere between 0% to 100% may be used).

To assist with one method of adjusting the backlight level, light sensor 36 is provided within the device 10. Sensor 36 is preferably a light sensitive device that converts detected light levels into an electrical signal, such as a voltage. The sensor 36 may be located anywhere on or within the device 10, having considerations for aesthetics and operation characteristics of sensor 36. However as discussed above, in one embodiment, an opening for light to be received by sensor 36 is located on the front cover of the housing of device 10 (to reduce the possibility of blockage of the opening), which accommodates a Y-shaped light guide that terminates at one end at message indicator 18 and branches inside the housing 12 so as to terminate in a message LED and the light sensor 36. Multiple sensors 36 may be provided and software may provide different emphasis on signals provided from different sensors 36. The signal(s) provided by sensor(s) 36 can be used by a circuit in device 10 to determine when device 10 is in a well-lit, dimly lit or moderately-lit environment, as discussed in greater detail below. This information can then be used to control backlight levels for keypad 24.

Figure 3:
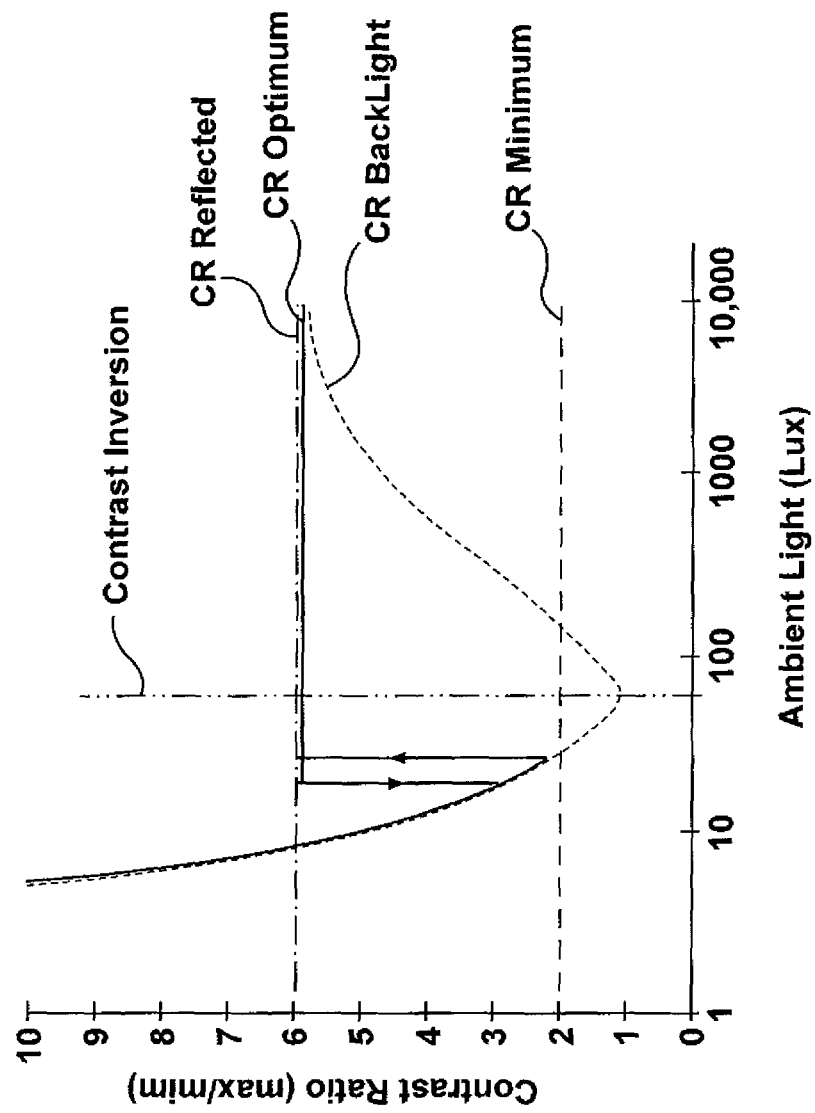
FIG. 3 is a graph showing contrast ratio vs. ambient light.

Reference is now made to FIG. 3 showing a graph of contrast ratio vs. ambient light. In order to ensure readability in the dark, backlight 37 must be turned on for ambient light levels less than a threshold value (corresponding to an optimum contrast ratio (CR Optimum) of 3:1 in the exemplary embodiment). In FIG. 3, the threshold is approximately 18 Lux. In general, the threshold may be determined according to the following equation:

$$E\text{threshold} = \text{pi} * L\text{backlight} / (3 * R\text{key} - R\text{character}),$$

where

Ethreshold is the optimum ambient light threshold (in Lux),
Lbacklight is the average luminance of the backlight characters in $cd/m^2$,
Rkey is the reflectance of the key surface, and
Rcharacter is the reflectance of the key indicia.

The foregoing equation is derived from the well known method of converting luminance measured in $cd/m^2$ to illuminance measured in Lux: $E = \text{pi} * L / R$.

However, as discussed above, a problem of readability of characters (or key indicia) on keypad 24 occurs when backlight 37 is on in a range of 'dim' lighting conditions below and above the ambient light level at which contrast inversion takes place (i.e. the range of ambient light levels below and above the vertical Contrast Inversion line and below a minimum contrast ratio (CR Minimum) at which the indicia is no longer legible). Although legibility is somewhat subjective, it has been found that for the exemplary embodiment the CR Optimum value of approximately 3:1 represents a threshold below which legibility may start to become a problem and a value of approximately 2:1 represents the minimum threshold (CR minimum) for legibility. Generally, the ambient light level at which contrast inversion takes place may be calculated by solving the following:

$$E\text{inversion} = \text{pi} * L\text{backlight} / (R\text{key} - R\text{character}).$$

The curve CR Backlight depicts the contrast ratio of the keypad 24 over a range of ambient light levels while the backlight 37 is illuminated. The line CR Reflected depicts the contrast ratio of the keypad 24 with the backlight 37 extinguished. A person of skill in the art will appreciate that the values, lines and curves depicted in FIG. 3 relate to an exemplary keypad 24 and backlight 37, but that the values, lines and curves may vary depending on variables such as reflectance of paint used for the indicia on keys of the keypad 24, colour and intensity of backlight 37, etc.

From the foregoing, it will be appreciated that prior to turning off the backlight, readability may suffer as a result of operating the backlight in the region of contrast inversion (e.g. the threshold ambient light level of 50 Lux results in a contrast ratio less than CR Minimum). The present disclosure sets forth a solution to his readability problem.

Figure 4:
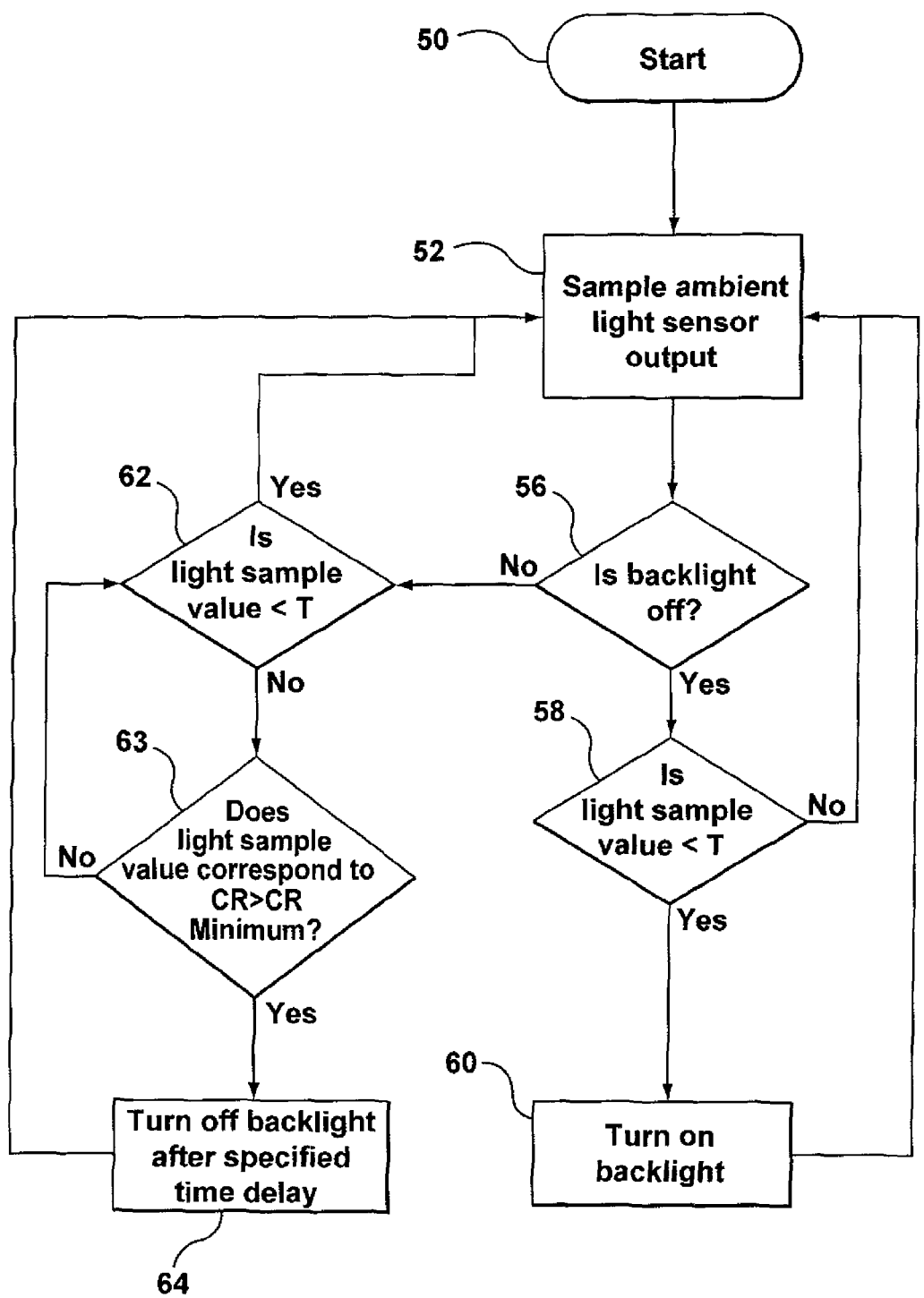
FIG. 4 is a flowchart showing steps in a method for automatically controlling a backlight in the electronic device of FIG. 1.

With reference to FIG. 4, a method is set forth for minimizing the impact of reduced contrast ratio for ambient lighting conditions in the vicinity of contrast inversion. Upon starting the algorithm (step 50) when the device 10 is turned on, the backlight mode is normally initialized to an appropriate mode using the ambient lighting sensed by the light sensor 36 at that time. Next, light sensor samples are taken at set intervals (step 52). The amount of time between each light sensor sample determines the sampling rate. A typical sampling rate is one sample per 1.2 seconds although in some situations the sampling rate may be increased to 400 ms temporarily for 5 samples to facilitate quick adjustment of the keypad backlight 37. At step 56, a determination is made as to whether the backlight is off 37 (the backlight will be off when the device 10 is initially powered on, or when the device is operating in bright ambient lighting conditions).

In the event that the backlight is off (a "Yes" at step 56), then the light sample is compared to a threshold T (step 58). As discussed above, in the exemplary embodiment the threshold T is preferably approximately 18 Lux, which is the threshold below which backlight illumination becomes necessary in order to read the key indicia. If the light sample is less than T, then backlight controller 26 turns on the backlight 37 under control of processor 20 (step 60). The method then reverts to step 52. If the light sample is not less than T, then the backlight 37 remains off and the method reverts to step 52.

In the event that the backlight is on (e.g. due to operation in dark conditions), then the light sample is again compared to the threshold T (step 62). If the light sample continues to be less than T, then the method reverts to step 52. However, if the light sample is not less than T, then the backlight 37 is turned off (step 64) to avoid legibility problems resulting from backlight operation in the range of ambient light conditions in the region of contrast inversion. However, in order to avoid disruptive or distracting flickering of the backlight 37 when the ambient light is in the region of threshold T, a time delay is introduced before turning off the backlight. According to the exemplary embodiment, a 2 second time delay is provided although longer delays may be necessary to filter out any momentary bright sample values. Also, rather than abruptly switching off the backlight 37, it is preferable that backlight controller 26 turn off the backlight 37 smoothly but quickly, for example by adjusting current or voltage applied to the lighting source, by selectively activating a selected number of lighting sources (e.g. one, several or all LEDs) or by selectively controlling the activation duty cycle of the activated lighting sources (e.g. a duty cycle anywhere between 0% to 100% may be used). Moreover, the backlight 37 is preferably not turned off until the light sample value is slightly higher (e.g. 24 Lux in the exemplary embodiment) than the threshold T at step 62, but not so high that the contrast ratio falls below the minimum contrast ratio (CR Minimum) between light and dark regions of key indicia (e.g. CR Minimum of 2:1, which corresponds to approximately 30 Lux in the exemplary embodiment). This difference in backlight switching thresholds results in a hysteresis loop comprising steps 62 and 63 that effectively shifts the contrast inversion point to a safer (i.e. higher) level before switching off the backlight 37, thereby avoiding backlight flicker (i.e. transitioning between the on and off states continuously when the light sample is close to the threshold value T of step 62). In particular, according to the exemplary embodiment of FIG. 3, the light sample value of 24 Lux is greater than the threshold T=18 Lux (step 62) but less than the value that corresponds to the minimum contrast ratio (step 63). In the exemplary embodiment, CR Minimum=2:1, which corresponds to approximately 30 Lux.

By operating the backlight 37 in accordance with the exemplary method of FIG. 4, the contrast between the illuminated characters (key indicia) and the light reflected from the surrounding material of the keypad 24 maintains a ratio that is suitable for legibility (i.e. in accordance with the curve CR Optimum in FIG. 3). A person of skill in the art will appreciate that the light sensor 36 must be sufficiently sensitive to resolve subtle changes in light level, especially in the 1 to 100 Lux range.

While the embodiments described herein are directed to particular implementations of the method for automatically adjusting keyboard brightness on a mobile handheld electronic device, it will be understood that modifications and variations to these embodiments are within the scope and sphere of the present application. For example, the backlighting brightness adjustment methodology set forth herein is not limited in its application to handheld electronic devices but may advantageously applied to other electronic devices such as desktop computers, cellular telephones, GPS receivers, smart telephones, and laptop computers. Also, as discussed above, specific values for the threshold T may vary depending on factors such as reflectance of the paint used for the key indicia, etc. Many other modifications and variations may occur to those skilled in the art. All such modifications and variations are believed to be within the sphere and scope of the present application.

What is claimed is:

1. A method for automatically adjusting keypad brightness on a mobile electronic device having a light sensor, a keypad and a backlight for the keypad, comprising:
   obtaining a light level samples from the light sensor; and
   turning the backlight:
      from off to on when a light level sample is less than a first threshold value below which backlight illumination is used, the first threshold value based on a first contrast ratio between light and dark regions of key indicia, and
      from on to off when the light level sample is greater than the first threshold value but less than a second threshold based on a second contrast ratio between the light and dark regions of key indicia, the second contrast ratio being less than the first contrast ratio the second contrast ratio based on a minimum contrast at which the key indicia is legible.

2. The method of claim 1, wherein the threshold value is pi*Lbacklight/(3*Rkey−Rcharacter), where Lbacklight is the average luminance of the key indicia in cd/m2, Rkey is the reflectance of the keypad, and Rcharacter is the reflectance of the key indicia.

3. The method of claim 2, wherein the threshold value is approximately 18 Lux.

4. The method of claim 1, wherein the backlight is turned from on to off after a given time period.

5. The method of claim 4, wherein the time period is approximately 2 seconds.

6. The method of claim 1, wherein the first contrast ratio is approximately 3:1.

7. The method of claim 1, wherein the second contrast ratio is approximately 2:1.

8. The method of claim 1, wherein the light level samples are obtained at a given sampling rate.

9. The method of claim 8, wherein the given sampling rate is one sample per approximately 1.2 seconds.

10. The method of claim 9, wherein the given sampling rate is temporarily increased to one sample per approximately 400 ms to facilitate quick adjustment of the backlight.

11. A mobile device, comprising:
a light sensor;
a keypad;
a backlight for the keypad;
a processor for obtaining light level samples from the light sensor and comparing the light level samples with a first threshold value and a second threshold value; and
a backlight controller for turning the backlight:
    from off to on when a current light level sample is less than the first threshold value below which backlight illumination is used, the first threshold based on a first contrast ratio between light and dark regions of key indicia, and
    from on to off when the current light level sample is greater than the first threshold value but less than the second threshold value based on a second contrast ratio between the light and dark regions of key indicia, the second contrast ratio being less than the first contrast ratio and based on a minimum contrast at which the key indicia is legible.

12. The mobile device of claim 11, wherein the threshold value is approximately 18 Lux.

13. The mobile device of claim 11, wherein the first contrast ratio is approximately 3:1.

14. The mobile device of claim 11, wherein the second contrast ratio is approximately 2:1.

15. The mobile device of claim 11, wherein the threshold value is $pi*L_{backlight}/(3*R_{key}-R_{character})$, where $L_{backlight}$ is the average luminance of the key indicia in $cd/m^2$, $R_{key}$ is the reflectance of the keypad, and $R_{character}$ is the reflectance of the key indicia.

16. A non-transitory computer-readable medium having instructions imbedded thereon for providing media with a data network, wherein the instructions, when executed by one or more computers, cause the one or more computers to:
    obtain a light level sample from the light sensor; and
    turn the backlight:
        from off to on when a light level sample is less than a first threshold value below which backlight illumination is used, the first threshold value based on a first contrast ratio between light and dark regions of key indicia, and
        from on to off when the light level sample is greater than the first threshold value but less than a second threshold based on a second contrast ratio between the light and dark regions of key indicia, the second contrast ratio being less than the first contrast ratio, the second contrast ratio based on a minimum contrast at which the key indicia is legible.

\* \* \* \* \*